(12) United States Patent
Shinozuka

(10) Patent No.: US 11,514,060 B2
(45) Date of Patent: Nov. 29, 2022

(54) SUPPORT SYSTEM, STORAGE MEDIUM, AND METHOD FOR PRESENTING RELATIONSHIPS OF ITEMS

(71) Applicant: KABUSHIKI KAISHA TOSHIBA, Minato-ku (JP)

(72) Inventor: Hiroshi Shinozuka, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 179 days.

(21) Appl. No.: 16/735,996

(22) Filed: Jan. 7, 2020

(65) Prior Publication Data

US 2020/0301930 A1    Sep. 24, 2020

(30) Foreign Application Priority Data

Mar. 22, 2019   (JP) .............................. JP2019-054870

(51) Int. Cl.
*G06F 16/2457*   (2019.01)
*G06F 16/28*   (2019.01)
(Continued)

(52) U.S. Cl.
CPC ...... *G06F 16/24578* (2019.01); *G06F 3/0482* (2013.01); *G06F 3/04845* (2013.01);
(Continued)

(58) Field of Classification Search
CPC ......... G06F 16/24575; G06F 16/24578; G06F 16/286; G06F 16/36; G06F 3/0482; G06F 3/04845
See application file for complete search history.

(56) References Cited

U.S. PATENT DOCUMENTS

| | | | | |
|---|---|---|---|---|
| 6,072,493 A | * | 6/2000 | Driskell ................. | G06Q 30/06 715/962 |
| 7,188,317 B1 | * | 3/2007 | Hazel .................... | G06F 3/0481 715/804 |

(Continued)

FOREIGN PATENT DOCUMENTS

| JP | 11-133846 A | 5/1999 | |
|---|---|---|---|
| JP | 11-249538 A | 9/1999 | |
| JP | 2019149019 A * | 9/2019 | ........... G06F 16/282 |

OTHER PUBLICATIONS

Nakazawa, T. "Product design process modeling and visualization", JSDE Journal, vol. 42, No. 4, 2007 (With Computer Generated English Translation), 18 pages.
(Continued)

*Primary Examiner* — Chau T Nguyen
(74) *Attorney, Agent, or Firm* — Maier & Maier, PLLC

(57) ABSTRACT

According to one embodiment, a support system includes an editor. The editor displays a first editing region and a second editing region. A plurality of first items is arrangeable in the first editing region. A plurality of second items is arrangeable in the second editing region. A corresponding item is arrangeable in the second editing region. The corresponding item is associated with a first selected item. The first selected item is one of the plurality of first items. A first subordinate item is subordinateable to the selected first item. A second subordinate item is subordinateable to the corresponding item. The second subordinate item is different from the first subordinate item.

11 Claims, 13 Drawing Sheets

(51) Int. Cl.
*G06F 3/0482* (2013.01)
*G06F 3/04845* (2022.01)
*G06F 16/36* (2019.01)

(52) U.S. Cl.
CPC ...... *G06F 16/24575* (2019.01); *G06F 16/282* (2019.01); *G06F 16/36* (2019.01)

(56) References Cited

U.S. PATENT DOCUMENTS

| | | | | |
|---|---|---|---|---|
| 8,727,780 | B2* | 5/2014 | Crouse | G06F 16/367 |
| | | | | 707/602 |
| 9,201,558 | B1* | 12/2015 | Dingman | G06F 3/048 |
| 2005/0091225 | A1* | 4/2005 | McKee | G06F 16/2428 |
| 2005/0182773 | A1* | 8/2005 | Feinsmith | G06Q 10/10 |
| 2007/0130511 | A1* | 6/2007 | Roberge | G06N 5/02 |
| | | | | 715/204 |
| 2011/0131234 | A1* | 6/2011 | Sasai | G06Q 10/00 |
| | | | | 707/769 |
| 2011/0208788 | A1* | 8/2011 | Heller | G06F 8/30 |
| | | | | 707/810 |
| 2013/0159906 | A1* | 6/2013 | Knospe | G06F 3/0481 |
| | | | | 715/771 |
| 2013/0212060 | A1* | 8/2013 | Crouse | G06F 16/93 |
| | | | | 707/602 |

OTHER PUBLICATIONS

K. Fujimoto, "Visualizing the Thinking with FreeMind, Open Source Mind Mapping Software" Journal of the Japanese Society for Artificial Intelligence, vol. 22, No. 1, Jan. 1, 2007, pp. 86-94 (with unedited computer generated English translation).

* cited by examiner

SUPPORT SYSTEM, STORAGE MEDIUM, AND METHOD FOR PRESENTING RELATIONSHIPS OF ITEMS

CROSS-REFERENCE TO RELATED APPLICATIONS

This application is based upon and claims the benefit of priority from Japanese Patent Application No. 2019-054870, filed on Mar. 22, 2019; the entire contents of which are incorporated herein by reference.

FIELD

Embodiments described herein relate generally to a support system, a storage medium, and a method for presenting relationships of items.

BACKGROUND

To systematize and share information, it is favorable to represent items relating to the information in a hierarchical structure. Technology is desirable in which the representation using the hierarchical structure of the information can be performed more efficiently.

DETAILED DESCRIPTION

Figure 1:
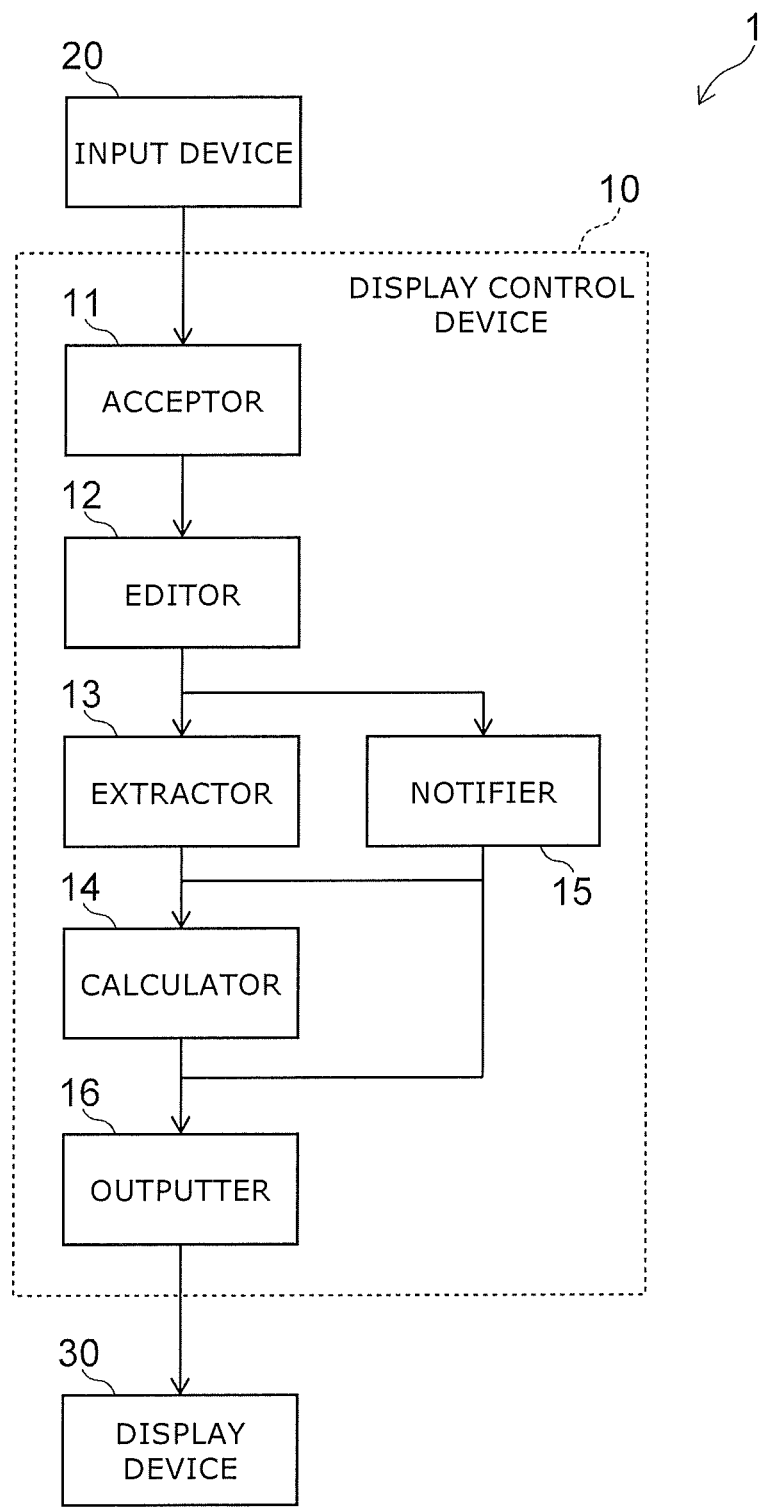
FIG. 1 is a block diagram illustrating the configuration of a support system according to an embodiment.

According to one embodiment, a support system includes an editor. The editor displays a first editing region and a second editing region. A plurality of first items is arrangeable in the first editing region. A plurality of second items is arrangeable in the second editing region. A corresponding item is arrangeable in the second editing region. The corresponding item is associated with a first selected item. The first selected item is one of the plurality of first items. A first subordinate item is subordinateable to the selected first item. A second subordinate item is subordinateable to the corresponding item. The second subordinate item is different from the first subordinate item.

According to one embodiment, a method for presenting relationships of items comprises displaying a first editing region where a plurality of first items are arrangeable. The method may further comprise displaying a second editing region where a plurality of second items are arrangeable. A corresponding item is arrangeable in the second editing region. The corresponding item is associated with a first selected item. The first selected item is one of the plurality of first items. The method may further comprise subordinating a first subordinate item to the first selected item. The method may further comprise subordinating a second subordinate item to the corresponding item. The second subordinate item is different from the first subordinate item.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a block diagram illustrating the configuration of a support system according to an embodiment.

FIG. 2 to FIG. 9B are schematic views illustrating GUIs of the support system according to the embodiment.

For example, the support system 1 according to the embodiment is used to visualize the parent-child relationships and the interactions of knowledge, and to efficiently edit the visualized knowledge. The knowledge is represented by multiple items such as needs, approaches, requirements, etc.

The support system 1 according to the embodiment includes a display control device 10 as illustrated in FIG. 1. The display control device 10 performs processing based on information input from an input device 20, and causes a display device 30 to display the information obtained by the processing. The display control device 10 includes a processing circuit including a central processing unit. In the example of FIG. 1, the support system 1 further includes the input device 20 and the display device 30.

The input device 20 is used when a user inputs the information to the display control device 10. The input device 20 includes, for example, at least one of a keyboard, a mouse, a touchpad, or a microphone (a voice input).

The display device 30 displays, to the user, the information output from the display control device 10. The display device 30 includes, for example, at least one of a monitor or a projector. The input device 20 and the display device 30 may be formed as one body as in a touch panel.

The display control device 10 includes, for example, an acceptor 11, an editor 12, and an outputter 16.

The acceptor 11 accepts the information input to the display control device 10 from the input device 20. The outputter 16 outputs the information to the display device 30. The editor 12 causes the display device 30 to display a graphical user interface (GUI) via the outputter 16. The GUI includes a first editing region and a second editing region for visualizing and editing information for a designated theme.

The theme is technology, a product, or the like that is the object of organizing the information or the knowledge. Items (multiple first items) are arranged in the first editing region. Part of the items represent needs. Another part of the items represent objects. The need items represent needs for the theme from a supplier, a customer, a market, etc. The object items represent suppliers, customers, markets, etc., that are the object of marketing. In the second editing region, multiple items (multiple second items) that include requirements and approaches for the theme are arranged. The requirement items represent functions, conditions, or problems necessary to realize the theme and the approaches. The approach items represent methods that can be employed to satisfy the requirement items. The approach item includes any method, means, approach, solution, process, operation, procedure, technique, course of action, strategy, scheme, or the like that can satisfy a requirement item.

A character string is written in each item by the user. The character string indicates the specific content of the need, the requirement, or the approach. The user uses the input device 20 to perform the arrangement of the items, the input of the character strings, the provision of various information, etc.

Figure 2:
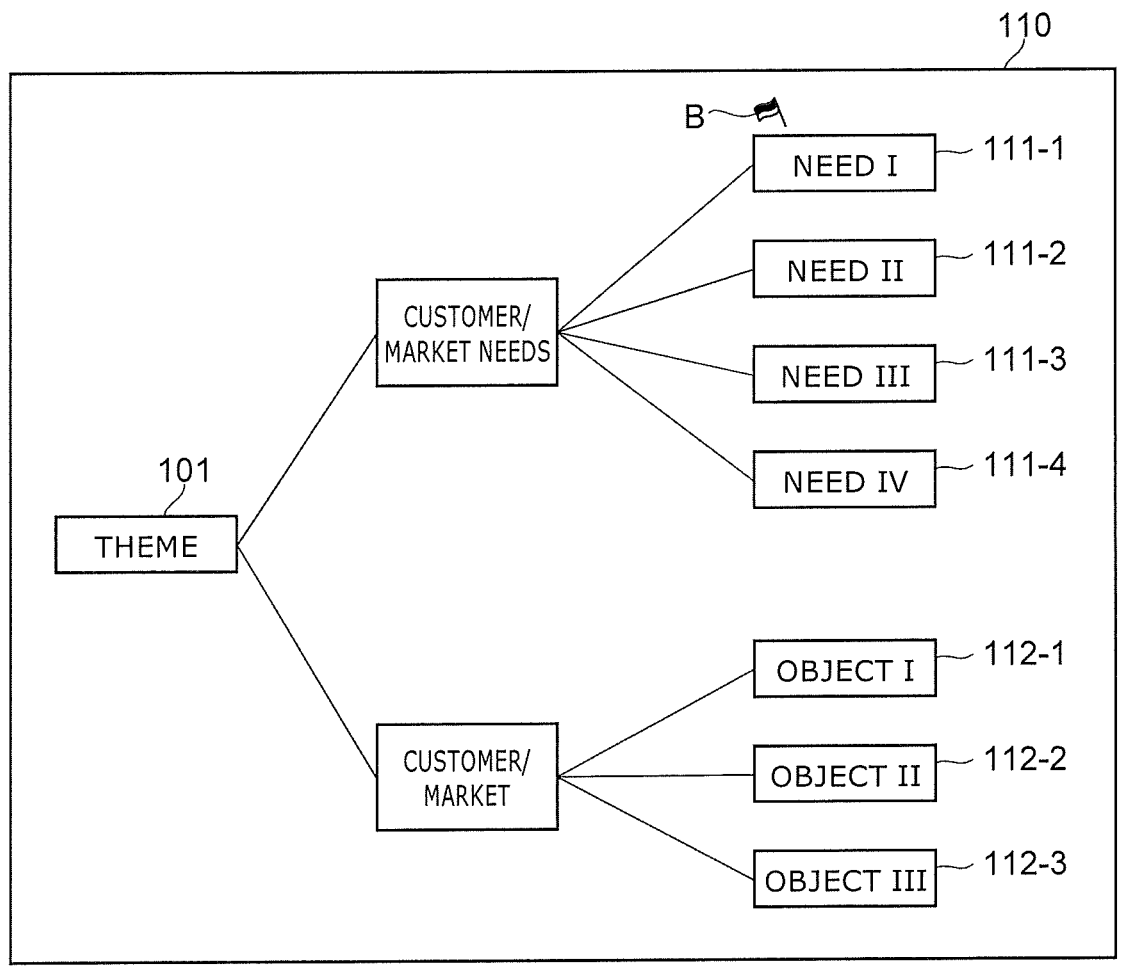
FIG. 2 is a schematic view illustrating GUIs of the support system according to the embodiment.
Figure 3:
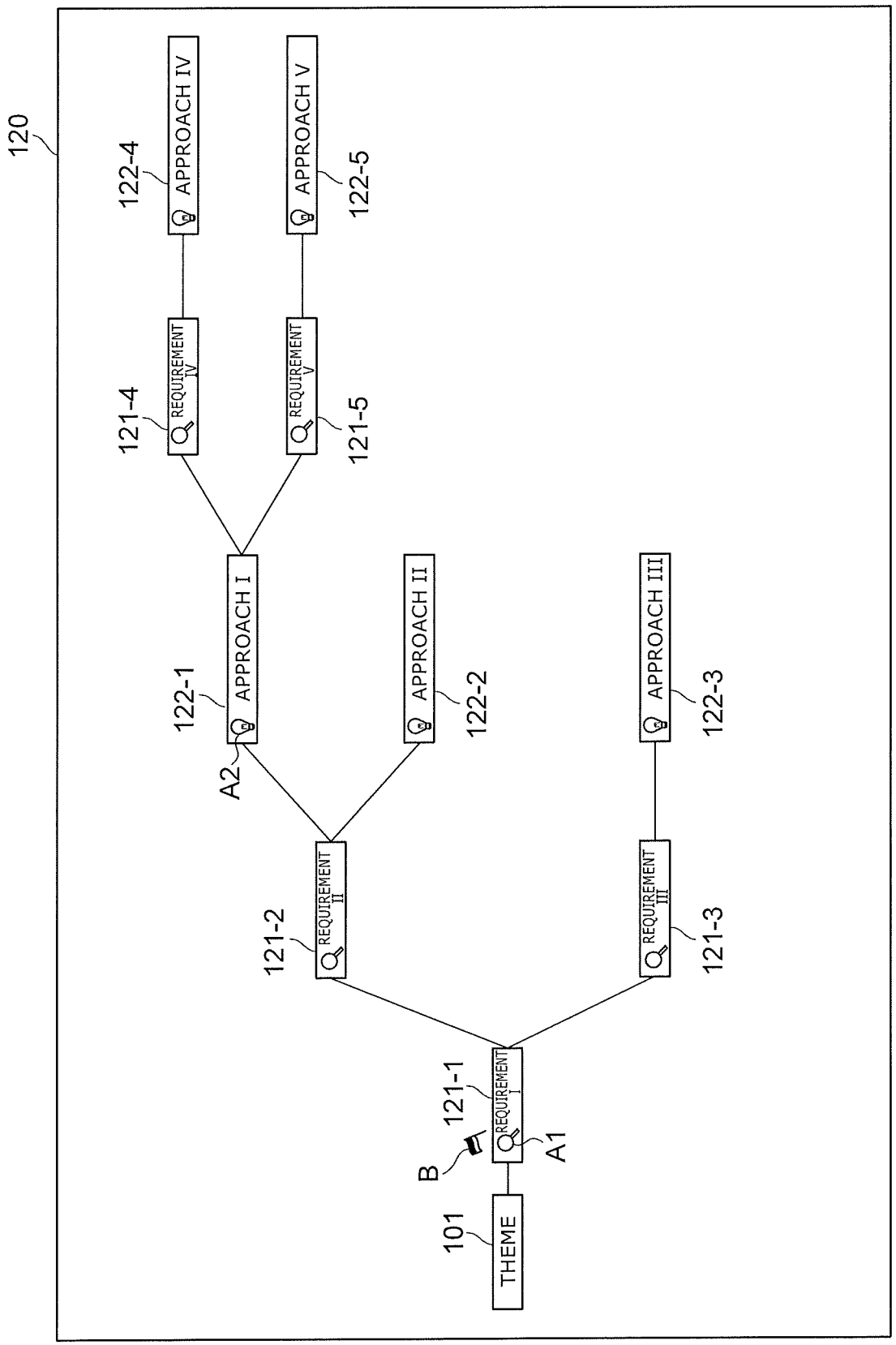
FIG. 3 is a schematic view illustrating GUIs of the support system according to the embodiment.

For example, the editor 12 displays GUIs including a first editing region 110 illustrated in FIG. 2 and a second editing region 120 illustrated in FIG. 3. The user of the support system 1 uses the input device 20 to make and edit a hierarchical structure relating to the knowledge in the first editing region 110 and the second editing region 120.

As illustrated in FIG. 2, the user can arrange a theme item 101, one or more need items 111, and one or more object items 112 in the first editing region 110.

For example, the need item 111 is described based on the perspective of customer value (Customer Value), expense to the customer (Cost), customer convenience (Convenience), communication with the customer (Communication), etc. In the example illustrated in FIG. 2, the multiple need items 111 that include need items 111-1 to 111-4 are arranged. For one need item 111, at least one other need item 111 that subdivides or paraphrases the one need item 111 may be subordinate to the one need item 111.

A specific classification such as a supplier, a market, or the like is written in the object item 112. For example, the object item 112 is represented using a feature relating to a human such as the gender, the age, the occupation, etc. The object item 112 may be represented using a name such as an industry, a business field, a designated group, a specific company, etc. For one object item 112, multiple other object items 112 that classify the object item 112 more finely can be subordinate to the one object item 112.

As illustrated in FIG. 3, the user can arrange the theme item 101, one or more requirement items 121, and one or more approach items 122 in the second editing region 120. The requirement item 121 is set as a child of the theme item 101. Other requirement items 121 and other approach items 122 are arranged to be subordinate to each other in the ranks lower than the requirement item 121.

The requirement item 121 is provided with information showing that the requirement item 121 is a requirement item. The approach item 122 is provided with information showing that the approach item 122 is an approach item. For example, as illustrated in FIG. 3, the user can provide each item with information showing that the item is a requirement item or an approach item by marking the item with a mark A1 or A2.

A requirement item 121 that is to be satisfied to realize an approach item 122 is subordinate to the approach item 122. Or, at least one other approach item 122 that subdivides or paraphrases the approach item 122 may be subordinate to the approach item 122.

At least one approach item 122 for satisfying a requirement item 121 is subordinate to the requirement item 121. Or, at least one other requirement item 121 that subdivides or paraphrases the requirement item 121 may be subordinate to the requirement item 121.

In the example illustrated in FIG. 3, the multiple requirement items 121 that include requirement items 121-1 to 121-5 and the multiple approach items 122 that include approach items 122-1 to 122-5 are arranged. In the example, one requirement item 121-1 is set for the theme item 101. The requirement items 121-2 and 121-3 are set for the requirement item 121-1. One approach item 122-3 is subordinate to the requirement item 121-3. The two approach items 122-1 and 122-2 are subordinate to the requirement item 121-2. The requirement items 121-4 and 121-5 are subordinate to the approach item 122-1. The approach items 122-4 and 122-5 are respectively subordinate to the requirement items 121-4 and 121-5.

The requirement item 121 can be provided with correspondence information showing that the requirement item 121 corresponds to the need item 111. When the functions, the conditions, or the problems of one requirement item 121 correspond to the need of one need item 111, the user provides the requirement item 121 with correspondence information relating to the need item 111. The user can associate the need item 111 and the requirement item 121 thereby.

In the example of FIG. 2 and FIG. 3, one need item 111 and one requirement item 121 are marked with a mark B. The mark B shows that the items marked with the mark B are associated with each other. For example, the user can arrange the requirement item 121 associated with the need item 111 by transferring the need item 111 arranged in the first editing region 110 into the second editing region 120. For example, the need item 111 that is arranged in the first editing region 110 can be transferred into the second editing region 120 by drag & drop. For example, the item that is transferred into the second editing region 120 automatically is provided with the information as the requirement item 121.

When transferring the need item 111 arranged in the first editing region 110 into the second editing region 120, another item that is subordinate to the need item 111 may be transferred together into the second editing region 120. It may be selectable whether to transfer the other subordinate item together into the second editing region 120. When multiple items are subordinate to the need item 111 to be transferred, only a part of the multiple items may be selectively transferable.

For example, it is also possible to arrange a "clone" of the item of one of the first editing region 110 or the second editing region 120 in the other of the first editing region 110 or the second editing region 120. The information that relates to the item arranged as the clone is synchronous with the information relating to the original item. For example, when an other item is subordinate to the original item, the other item is subordinate also to the clone item. The reverse also is similar, that is, when an other item is subordinate to the clone item, the other item is subordinate also to the original item. Items that are different from each other cannot be subordinate to the clone item and the original item. For example, the clone function can be utilized when replicating the exact same items from one region to the other region.

As illustrated in FIG. 2 and FIG. 3, the organization of the information in which the need items 111 and the object items 112 are arranged in the first editing region 110 and the requirement items 121 and the approach items 122 are arranged in the second editing region 120 for the theme item 101 is called "knowledge breakdown" (registered trademark). Here, the information that is made by knowledge breakdown is called "knowledge breakdown information."

Effects of the Embodiment Will Now be Described.

According to the support system 1 according to the embodiment, for example, the editor 12 displays the first editing region 110 and the second editing region 120 as illustrated in FIG. 2 and FIG. 3. The user can organize the information by arranging multiple items in the first editing region 110 and the second editing region 120. For example, in one of the first editing region 110 or the second editing region 120, the information when viewed from some perspective can be organized. In the other of the first editing region 110 or the second editing region 120, the information when viewed from another perspective can be organized. In other words, for one theme, the information can be organized from mutually-different perspectives.

In the second editing region 120, an item (a corresponding item) that is associated with an item (a first selected item) arranged in the first editing region 110 can be arranged. The set of mutually-associated items can be confirmed in the first editing region 110 and in the second editing region 120. Therefore, even when organizing the information from mutually-different perspectives by using the first editing region 110 and the second editing region 120, the information can be organized while confirming the items corresponding between the first editing region 110 and the second editing region 120.

Other items that are different from each other can be subordinate respectively to the first selected item and the corresponding item. Accordingly, the information of the items corresponding to each other can be organized in more detail from mutually-different perspectives. This function is different from the clone function. This is because when using the clone function, if an other item is caused to be subordinate to the first selected item, the other item is replicated and becomes subordinate also to the corresponding item. The organization of detailed information based on mutually-different perspectives is difficult for the clone function.

For example, in the first editing region 110 as illustrated in FIG. 2 and FIG. 3, the information is organized so that the theme is viewed from the viewpoint of the side of receiving a service such as a supplier, a customer, a market, etc. In the second editing region 120, the information is organized so that the theme is viewed from the viewpoint of the side of providing an object or a service. Typically, the advantages and the disadvantages on the side of receiving the service do not match the advantages and the disadvantages on the side of providing the service. The information that relates to the theme item 101 can be organized comprehensively from mutually-different perspectives by arranging the items in the first editing region 110 and the second editing region 120 while appropriately associating the items between the regions. Also, in such a case, realization approaches that relate to the first selected item can be organized logically by causing the hierarchical structure including the requirements and the approaches to be subordinate to the corresponding item of the second editing region 120 associated with the first selected item of the first editing region 110. Thereby, the user more efficiently can perform the representation using the hierarchical structure of the information.

Figure 4:
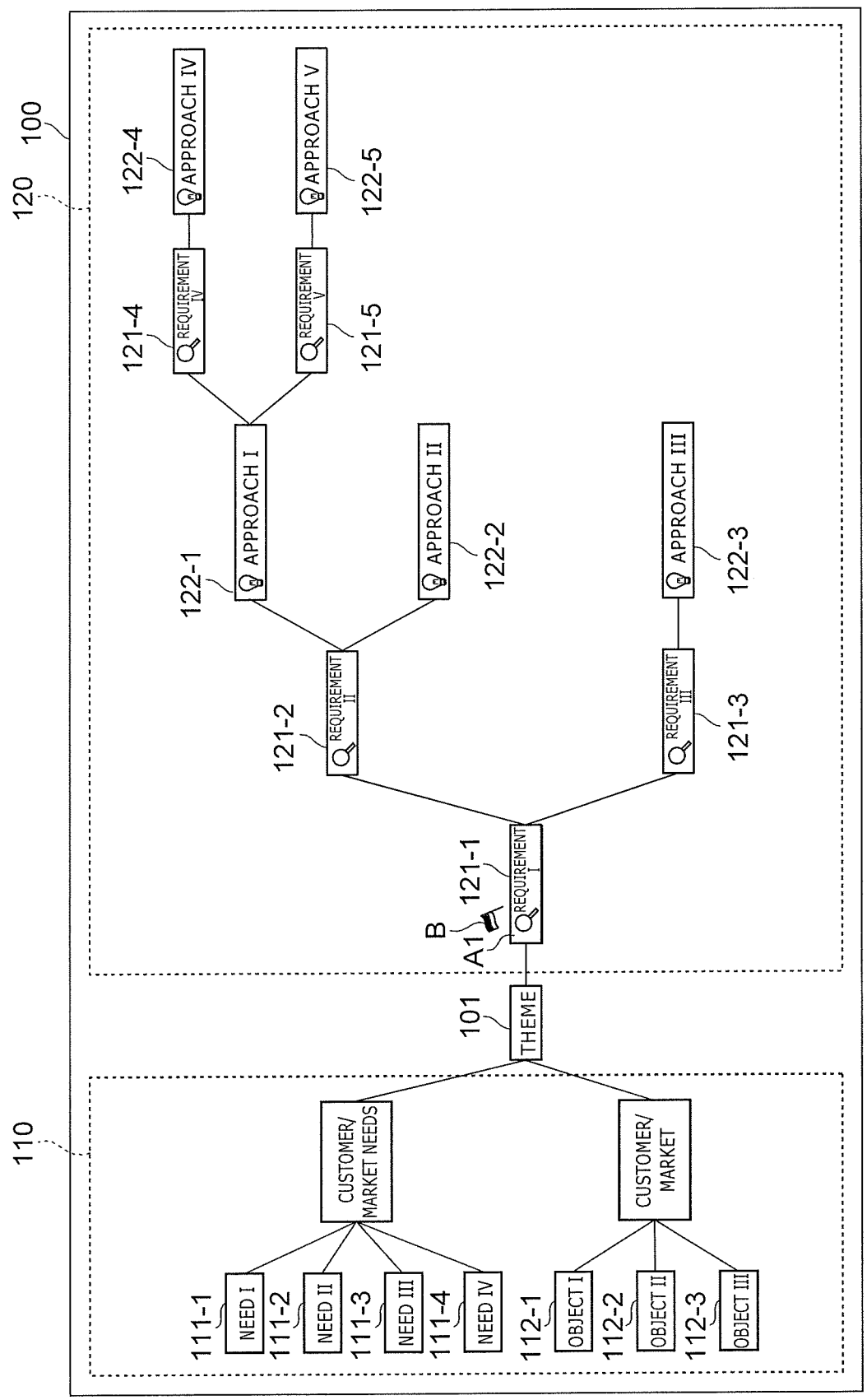
FIG. 4 is a schematic view illustrating GUIs of the support system according to the embodiment.

The first editing region 110 and the second editing region 120 may be displayed in mutually-different windows in a screen displayed in the display device 30. Or, the first editing region 110 and the second editing region 120 may be displayed as being separated from each other inside one window. Or, the first editing region 110 and the second editing region 120 may be displayed as one body as illustrated in FIG. 4. For example, a part of one region is used as the first editing region 110; and another part of the one region is used as the second editing region 120.

Additional functions of the support system 1 according to the embodiment will now be described. An example in which the first editing region 110 and the second editing region 120 are displayed as one body as illustrated in FIG. 4 also will be described.

The display control device 10 further includes, for example, a plan extractor 13, a calculator 14, and a notifier 15.

The edited hierarchical structure includes at least one plan for satisfying the requirement item 121 of the highest rank. The requirement item 121 of the highest rank refers to at least one requirement item 121 included in the hierarchical structure and positioned at the highest rank. For example, the requirement item 121 of the highest rank is the requirement item 121 set as the child of the theme item 101 positioned at the highest rank (the root) of the hierarchical structure. The plan includes at least one approach. The extractor 13 extracts plans from the edited hierarchical structure. When multiple requirement items 121 are set as the children of the theme item 101, the combination of the approach items 122 for satisfying the multiple requirement items 121 of the highest rank are extracted as the plans. The case where multiple approach items 122 are subordinate to one item in the hierarchical structure means that multiple plans exist.

For example, first, the extractor 13 extracts the requirement item 121 of the highest rank in the edited hierarchical structure. Continuing, the extractor 13 scans through the items included in the subtree having that requirement item 121 as the root and extracts, as the plan, at least one approach item 122 included in the items. When multiple requirement items 121 are subordinate to one item, the multiple approach items 122 that are subordinate to each of these requirement items 121 are included in the plan. When multiple approach items 122 are subordinate to one item, a plan is generated for each combination of these approach items 122. When multiple requirement items 121 of the highest rank exist, at least one approach item 122 up to the end for each of the requirement items 121 is extracted for each of the requirement items 121; and the combinations of these approach items 122 are extracted as the plans.

In the example illustrated in FIG. 3, one requirement item 121-1 is subordinate to the theme item 101. The two requirement items 121-2 and 121-3 are subordinate to the requirement item 121-1. One approach item 122-3 is subordinate to the requirement item 121-3. On the other hand, the approach item 122-1 and the approach item 122-2 are subordinate to the requirement item 121-2. This means that the three plans of the plan including the approach items 122-1 and 122-3, the plan including the approach items 122-2 and 122-3, and the plan including the approach items 122-1, 122-2, and 122-3 exist.

For example, typically, the requirements and the approaches are represented in different hierarchical structures. However, in such a case, after making each of the hierarchical structures, it is necessary to draft the plans by appropriately selecting the requirement items and the approach items from their respective hierarchical structures. In the embodiment, the effort of drafting the plans is omitted because the requirement items and the approach items are included in one hierarchical structure. Also, the support system 1 includes the extractor 13 that extracts the plans from the edited hierarchical structure. Thereby, the plans can be extracted easily and appropriately from the hierarchical structure in which the requirement items 121 and the approach items 122 coexist.

Identification information can be provided to the need items 111. For example, as in the need item 111-1 illustrated in FIG. 5, the display is different between the need items 111 provided with identification information and the need items 111 not provided with identification information. The need item 111-3 that is provided with identification information is marked with dots. For example, the user provides identification information to the need items 111 desired to be satisfied.

For example, among the need items 111 provided with identification information, the editor 12 causes the display form of a need item 111 (a second selected item) associated with a requirement item 121 to be different from the display form of a need item 111 (a third selected item) not associated with the requirement item 121. A mode in which the display forms are caused to be different and a mode in which the display forms are caused not to be different are switchable. In the example illustrated in FIG. 5, the need items 111 that are provided with identification information are marked with dots. The density of the dots of the need items 111 associated with the requirement items 121 is higher than the density of the dots of the need items 111 not associated with the requirement items 121. The requirement items 121 that are associated with the need items 111 provided with identification information are marked with dots having a high density.

It is desirable for the need items 111 provided with identification information to be associated with the requirement items 121 and to investigate whether the approach items 122 satisfy the requirement items 121. Because the existence or absence of an association can be confirmed in the display, the user easily can confirm whether or not all of the need items 111 provided with identification information are associated with the requirement items 121.

It is desirable for at least one of the multiple need items 111 to be provided with identification information to organize the importance of each need item 111, the existence or absence of the requirement items 121 associated with the important need items 111, etc. For example, when none of the need items 111 arranged in the first editing region 110 are provided with identification information, the notifier 15 emits a notification to the user to prompt the provision of the identification information.

The object items 112 and the approach items 122 may be provided with object information showing mutual correspondence. In the example illustrated in FIG. 5, the object items 112 and the approach items 122 that correspond to each other are marked with marks C1 and C2 showing that object information is provided. Specifically, an object item 112-1, the approach item 122-1, and the approach item 122-4 are marked with the mark C1. This shows that for the object item 112-1, the approach item 122-1 is employed as an approach for satisfying the requirement item 121-2; and the approach item 122-4 is employed as an approach for satisfying the requirement item 121-4. Similarly, an object item 112-3 and the approach item 122-2 are marked with the mark C2. This shows that for the object item 112-3, the approach item 122-2 is employed as an approach for satisfying the requirement item 121-2. By providing the object information, it can be clear which of the approach items 122 are employed for which of the object items 112.

Figure 6:
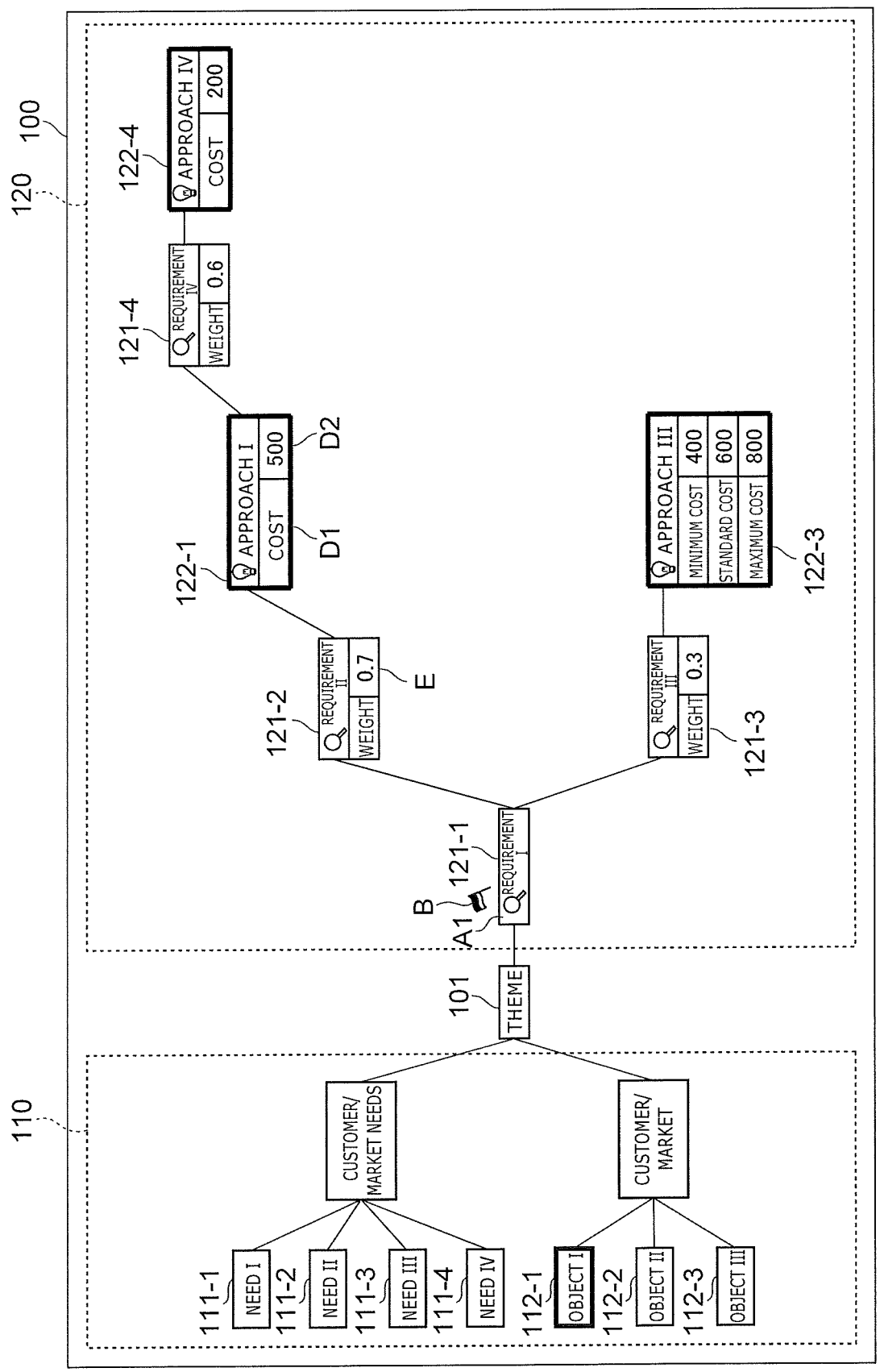
FIG. 6 is a schematic view illustrating GUIs of the support system according to the embodiment.

The editor 12 can display a plan including an approach item 122 associated with a designated object item 112 to be differentiable from the other plans. For example, when the designated object item 112 is selected, the editor 12 causes the display form of the approach item 122 associated with the object item 112 to be different from the display form of the unassociated approach items 122. As illustrated in FIG. 6, the editor 12 may display only the plans including the approach items 122 associated with the designated object item 112 and may cause a non-display of the other requirement items 121 and the other approach items 122.

When an item is arranged and a character string is written in the first editing region 110 or the second editing region 120, the editor 12 may display reference information showing description examples of the item based on the character string written in the item. The reference information may be displayed after completing the writing or may be displayed partway through the writing. For example, the reference information is an image illustrating at least a part of previous knowledge breakdown information. For example, when an item is arranged in the first editing region 110, an image that shows at least a part of the item arranged in the first editing region 110 from previous knowledge breakdown information is displayed. When an item is arranged in the second editing region 120, an image that shows at least a part of the item arranged in the second editing region 120 from previous knowledge breakdown information is displayed.

Figure 7:
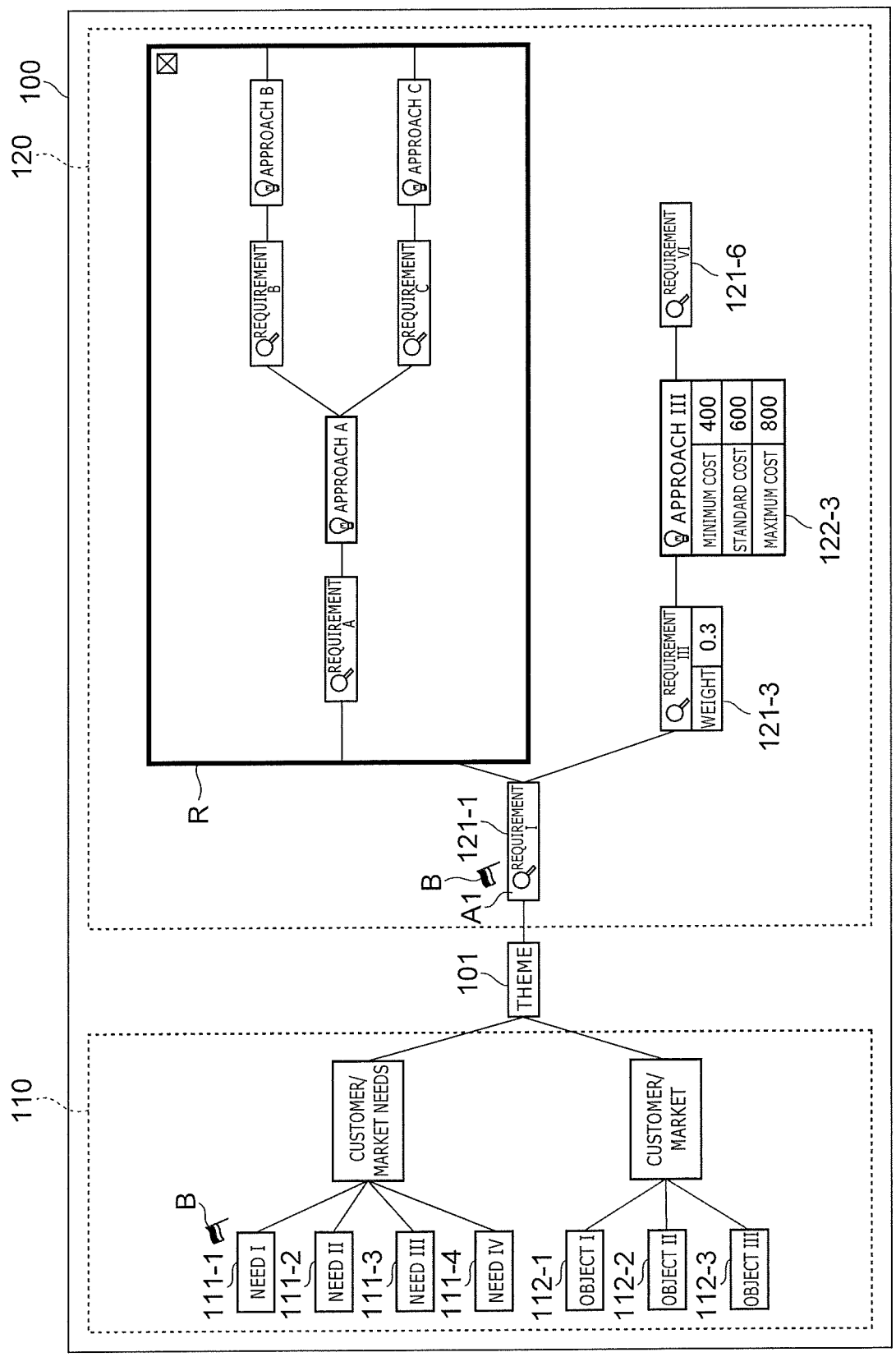
FIG. 7 is a schematic view illustrating GUIs of the support system according to the embodiment.

For example, as illustrated in FIG. 7, the user arranges a requirement item 121-6 to be subordinate to the approach item 122-3. At this time, the editor 12 displays reference information R. In the example, the reference information R illustrates a part of the second editing region 120 of previous knowledge breakdown information. For example, the user can switch so that the entire first editing region 110 is displayed in the reference information R.

The reference information R may be displayed inside the window where the first editing region 110 and the second editing region 120 are displayed or may be displayed in a window other than this window. Multiple reference information R may be displayed based on the previous knowledge breakdown information. The user also can cause a non-display of the displayed reference information R.

For example, when the user writes the character string in the item, the editor 12 accesses a database. The database stores multiple reference information and multiple character strings. The multiple character strings are associated respectively to the multiple reference information. The editor 12 converts the input character strings and the multiple character strings stored in the database into vectors and calculates the distances between each of the vectors. For example, the editor 12 vectorizes each character or each word included in the character string and generates a vector corresponding to the character string. The editor 12 may generate a vector corresponding to the character string based on the meaning of the character string. Or, vectors based on character strings may be associated with reference information in the database. The editor 12 selects one or more character strings having a short distance to the input character string, and displays one or more reference information corresponding to the one or more character strings.

The editor 12 may refer to an ontology. The editor 12 extracts one or more character strings having a relationship with the input character string from the multiple character strings stored in the database for the ontology. The editor 12 displays one or more reference information corresponding to the extracted one or more character strings.

To search the reference information, the character string of a newly-arranged item and the character string of an other item subordinate to the item may be used. The editor 12 converts the character string of the newly-arranged item and the character string of the other item subordinate to the item into vectors. In the database, the character string of one item and the character string of an other item subordinate to the one item are associated with each reference information. The editor 12 converts the character string of the one item and the character string of the other item subordinate to the one item associated with each reference information into vectors. Subsequently, the editor 12 calculates the distances between the vectors and extracts one or more reference information based on the distances. By searching the reference information by using the character strings of multiple items, the reference information R that has a higher relevancy with the knowledge breakdown performed by the user can be displayed.

Information other than a previous knowledge breakdown may be displayed as the reference information R. For example, the reference information R may be at least a part of a work report, at least a part of case studies, at least a part of a question-answer list, etc. The specific content of the reference information R is arbitrary as long as a problem and a solution for the problem are shown.

For example, when the user clicks the reference information R, the character string that is associated with the reference image is written automatically in the item arranged by the user. By a designated operation, the user also can return the character string automatically written in the item to the original character string input by the user.

Figure 5:
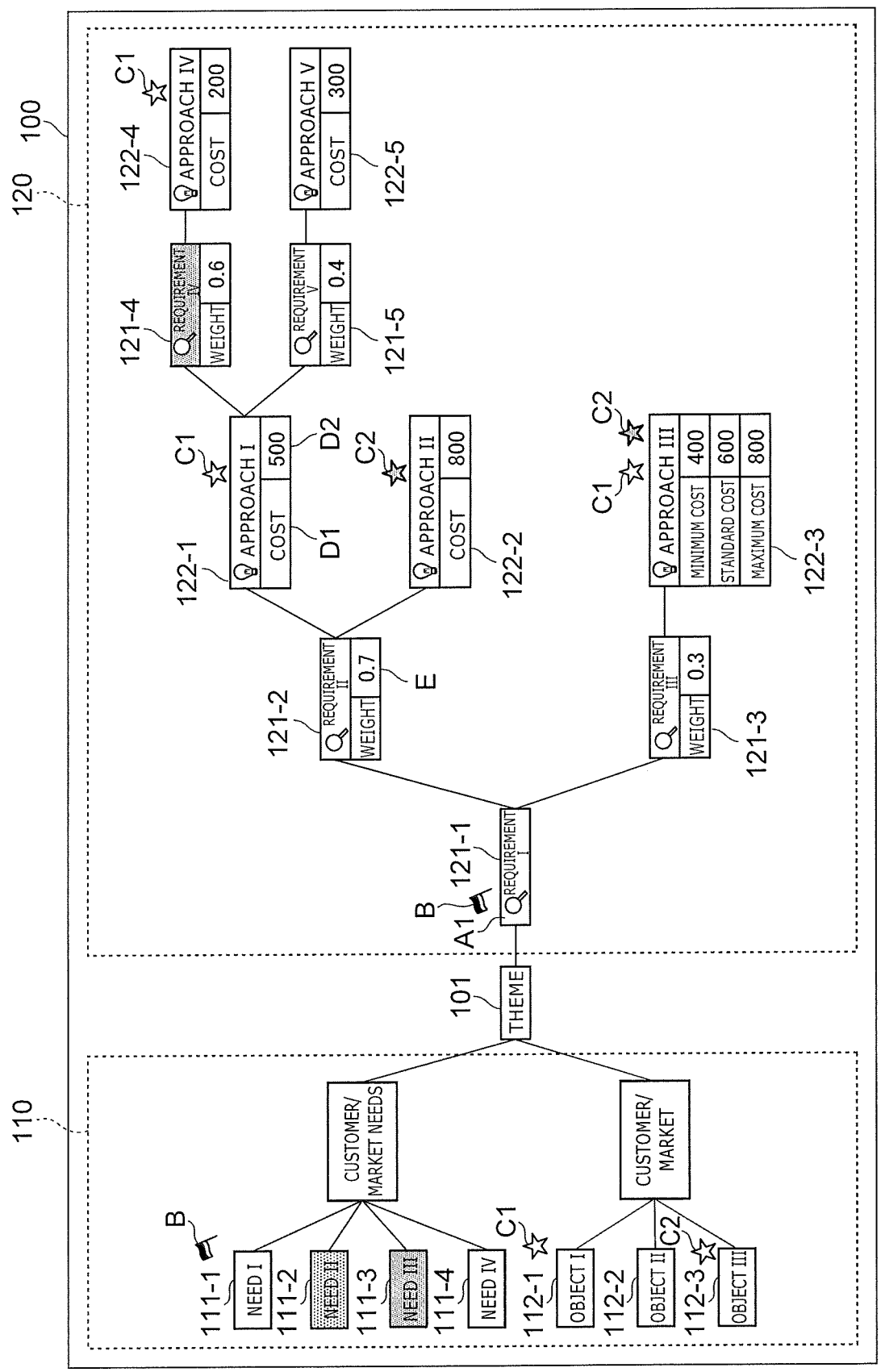
FIG. 5 is a schematic view illustrating GUIs of the support system according to the embodiment.

As illustrated in FIG. 5, an attribute D1 and an attribute value D2 that relate to the attribute D1 can be set for the approach item 122. For example, the cost, the time (the leadtime), the dimensions, the life, the performance, etc., are set as the attributes D1 when a product to be designed/developed is set as the theme item 101. When it is desirable to perform more detailed organization of the knowledge, for example, material costs, processing costs, transportation costs, etc., may be set as more specific costs. For example, the timing of the market launch, the time from making arrangements to delivery, the development man-hours, the production man-hours, etc., may be set as more specific times. Or, when the customer value is used as an indicator, the number of interviews with the customer, the frequency of the interviews, the depth of the conversation content, etc., may be set as the attributes D1. The content that is set to the attribute D1 is modifiable as appropriate according to the goal of making the hierarchical structure. The attribute values D2 are specific numerical values relating to their attributes D1.

When other multiple approach items 122 are set at ranks lower than one approach item 122, the attribute value of the approach item 122 of the higher rank is the total of the attribute values of the multiple approach items 122 of the lower ranks. For example, the attribute value of the approach item 122-1 is the total of the attribute value of the approach item 122-4 and the attribute value of the approach item 122-5. The total value may be input manually by the user or may be input by being calculated automatically by the support system 1.

A weight E can be set for the requirement item 121. The weight is an indicator of the importance or the priority of the requirement. For example, the weight is set to increase as the importance of the requirement item 121 increases. For example, the weight is set so that the total of the weights of the requirement items 121 of the siblings subordinate to the same item is 1.0 (100%). Or, the proportion of the weight set to each requirement item 121 to the total of the weights may be used as the weight of each requirement item 121.

When other multiple requirement items 121 are set at ranks lower than one requirement item 121, the substantial weight of each requirement item 121 of the lower ranks is the product of the weight of the requirement item 121 of the higher rank and the weight of each requirement item 121 of the lower rank. For example, the substantial weight of the requirement item 121-4 is 0.42, i.e., the product of the weight of 0.7 of the requirement item 121-2 and the weight of 0.6 of the requirement item 121-4.

The calculator 14 extracts the attributes and their attribute values for the plans extracted by the extractor 13 and calculates the total of the attribute values for each attribute. For each plan, the calculator 14 calculates the substantial weights of the requirements. The calculator 14 calculates the total of the costs and the substantial weights of the requirements for at least one of the plans. The calculator 14 causes the display device 30 to display the calculated results from the outputter 16.

By setting the weights, the importance of each requirement item 121 can be visualized. Further, when other multiple requirement items 121 are set at ranks lower than one requirement item 121, the calculator 14 sets the substantial weights of each of the requirement items 121 of the lower ranks using the product of the weight of each requirement item 121 of the lower rank and the weight of the requirement item 121 of the higher rank. The substantial weights show the weights of the requirement items 121 for the entire hierarchical structure. Accordingly, by the calculator 14 performing such a calculation, it is possible to easily ascertain the weights of the requirement items 121 for the entire hierarchical structure.

For one concept, an attribute for which a maximum attribute value is set, an attribute for which a standard attribute value is set, and an attribute for which a minimum attribute value is set may be set for the approach item 122. For example, the three attributes that relate to the costs of the maximum cost, the standard cost, and the minimum cost are set for the approach item 122-3 illustrated in FIG. 5 to FIG. 7. These attributes are independent attributes, but define attribute values relating to the common concept of cost.

Figure 8:
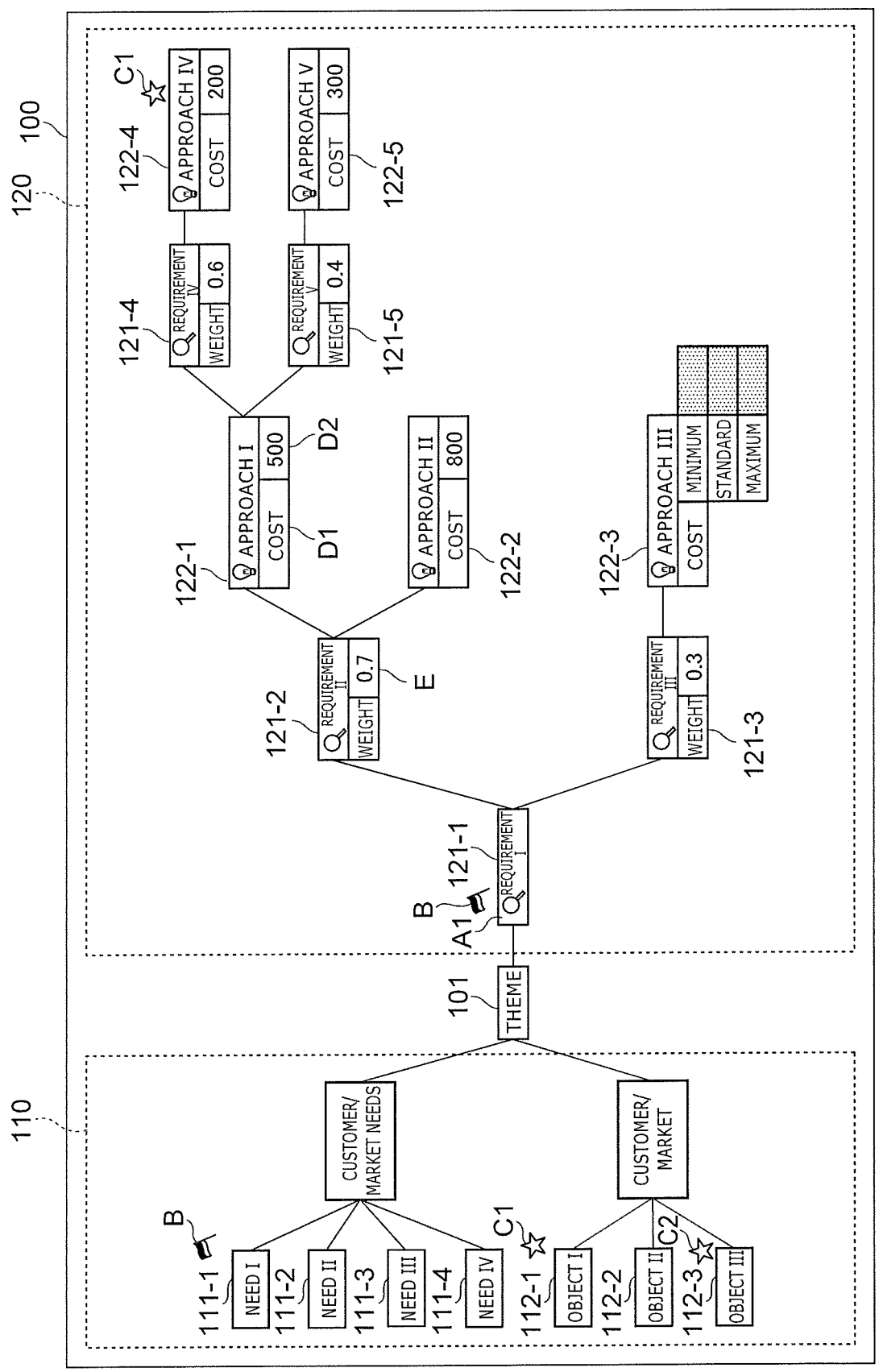
FIG. 8 is a schematic view illustrating GUIs of the support system according to the embodiment.

For example, when inputting the character string of the attribute D1, a space to input the maximum value, a space to input the standard value, and a space to input the minimum value are displayed for the attribute D1 as in the approach item 122-3 illustrated in FIG. 8. The user can set the maximum value, the standard value, and the minimum value by inputting the values into the spaces. For example, as a result, the maximum cost, the standard cost, and the minimum cost are set for the cost as illustrated in FIG. 5 to FIG. 7.

When the maximum value, the standard value, or the minimum value are input, the notifier 15 may determine whether or not there is an inconsistency in the values. For example, the notifier 15 emits a notification when the value input as the maximum value is less than the value input as the standard value or the minimum value. The notifier 15 may prompt to interchange the value input as the maximum value with the value input as the standard value or the minimum value.

In the second editing region 120, the state of a blank cell existing in one of the maximum value, the standard value, or the minimum value may or may not be permitted. The notifier 15 may emit a notification to prompt an input when a blank cell exists in one of the maximum value, the standard value, or the minimum value. When the user inputs the standard value, the value may be copied automatically to the maximum value and the minimum value. Thereby, the existence of a blank cell at one of the maximum value, the standard value, or the minimum value can be prevented. When the user inputs the standard value, the maximum value and the minimum value may be input automatically based on the standard value. As an example, 1.2 times the standard value is input as the maximum value. 0.8 times the standard value is input as the minimum value.

When the attribute of the maximum value, the attribute of the standard value, and the attribute of the minimum value are set for one approach item 122, the calculator 14 calculates the total of the maximum values, the total of the standard values, and the total of the maximum values for one plan.

Figures 9A, 9B:
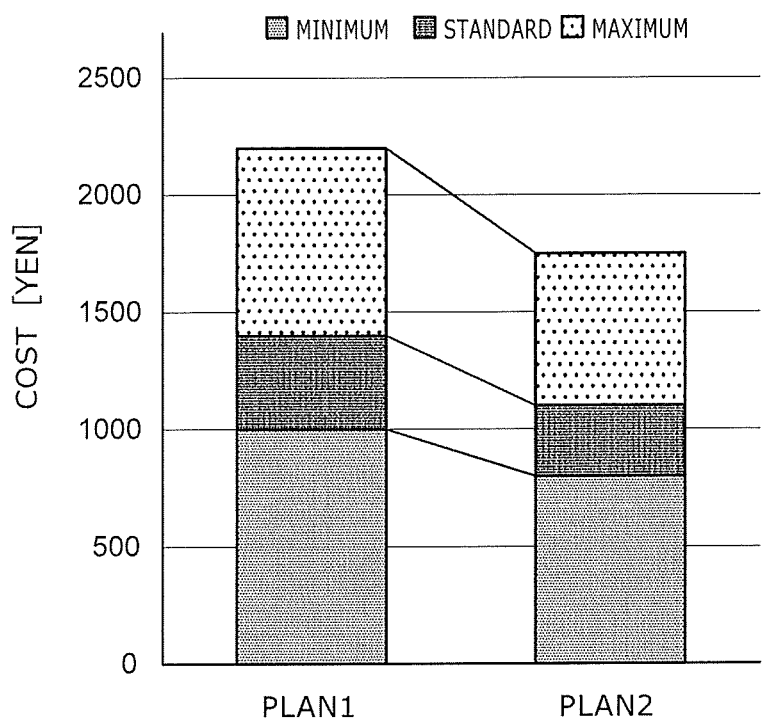
FIGS. 9A and 9B are schematic views illustrating GUIs of the support system according to the embodiment.

The display device 30 outputs the calculation results of the calculator 14 to, for example, a GUI. FIGS. 9A and 9B illustrate calculation results relating to a plan other than that of FIG. 5. For example, as illustrated in FIG. 9A, the display device 30 displays the visualization of the total of the maximum values, the total of the standard values, and the total of the minimum values of the attributes for each plan.

As illustrated in FIG. 9B, the display device 30 may output the substantial weights of the requirement items 121 and the totals of the attribute values of the approach items 122 satisfying the requirement items 121 for each plan. For example, the display device 30 arranges the requirement items 121 in order of increasing weight. Thereby, the user easily can ascertain whether or not the attribute values match the set weights.

When extracting the plans from the hierarchical structure, the extractor 13 may determine whether or not requirement items 121 associated with the need items 111 are included in the plans. For example, the outputter 16 causes the display device 30 to display the extracted plans and the need items 111 achieved by the plans. Thereby, the user easily can confirm the achieved need items 111 for each plan.

In the first editing region 110, a state in which both the requirement item 121 and the approach item 122 are subordinate to one requirement item 121 or one approach item 122 is not permitted. The notifier 15 notifies the user when both the requirement item 121 and the approach item 122 are subordinate to one item.

For example, when one of a new requirement item 121 or a new approach item 122 is subordinate to one item, the notifier 15 determines whether or not the other of the requirement item 121 or the approach item 122 is subordinate to a sibling item. When both the requirement item 121 and the approach item 122 are subordinate to one item, the notifier 15 displays a warning phrase to the user in the first editing region 110. For example, the calculator 14 does not perform the calculations relating to the attribute values and the weights until such an unpermitted state is resolved.

In the edited hierarchical structure, the item of an end (a leaf) typically is the approach item 122. This is because when an end is the requirement item 121, this means that an approach for satisfying the requirement item 121 does not exist. For example, the notifier 15 emits a notification to the user in such a case as well. However, the end may be the requirement item 121 when a realistic approach item 122 for satisfying the requirement item 121 does not exist. Accordingly, when the end is the requirement item 121, the calculator 14 may perform the calculations relating to the attribute values and the weights.

When an item is arranged in the first editing region 110 or the second editing region 120, the notifier 15 may emit a notification as appropriate to the user based on the character string written in the item. For example, the notifier 15 performs morphological analysis of the character string of each item. The character string is segmented into one or more words by the morphological analysis. The notifier 15 estimates the part of speech of each word. When the character string has only one word, the notifier 15 emits a notification to the user to be more specific for the description relating to the item. The notifier 15 emits a notification to the user when the part of speech of the final word of the character string is a noun (a substantive stop). This is because a description using a substantive stop easily becomes unclear.

When an item is arranged in the first editing region 110 or the second editing region 120, the notifier 15 may determine whether or not the description content of the item is appropriate. For example, items based on the viewpoint of the side of receiving the service are arranged in the first editing region 110. Items based on the viewpoint of the side of providing the service are arranged in the second editing region 120. When determining that the description content of the item arranged in the first editing region 110 is not based on the viewpoint of the side of receiving the service, the notifier 15 emits a notification to prompt the user to reconsider. When determining that the description content of the item arranged in the second editing region 120 is not based on the viewpoint of the side of providing the service, the notifier 15 emits a notification to prompt the user to reconsider.

The notifier 15 refers to a database to determine whether or not the description content is appropriate. The database is stored in a memory device included in the display control device 10 or a memory device provided outside the display control device 10. The database includes, for example, multiple description examples based on the viewpoint of the side of receiving the service and multiple description examples based on the viewpoint of the side of providing the service.

When an item is arranged in the first editing region 110 or the second editing region 120, the notifier 15 calculates the similarities between the description content of the item and each of the multiple description examples included in the database. For example, the notifier 15 converts each of the character strings into a vector and calculates the distances between the vectors. The notifier 15 uses the calculated distances as the similarities. For example, the notifier 15 calculates the total of a specified number of similarities in order from small similarities. When the total exceeds a preset threshold, the notifier 15 emits a notification to the user.

The database may include previous knowledge breakdown information. When an item is arranged in the first editing region 110 or the second editing region 120, the notifier 15 calculates the similarities between the description content of the item and the description content of multiple items arranged in a previous first editing region 110 or a previous second editing region 120. For example, the notifier 15 calculates the total of a specified number of similarities in order from small similarities. When the total exceeds a preset threshold, the notifier 15 emits a notification to the user.

For example, when an item is arranged in the first editing region 110 or the second editing region 120 and the description content of the item is determined to be appropriate, the notifier 15 adds the description content to the database. When an item is arranged in the first editing region 110 or the second editing region 120 and the description content of the item is determined to be inappropriate, the notifier 15 provides error information to the item. It is desirable for the error information to be displayed on the GUI so that the user can visually confirm the error information. For example, the user can input that the description content of the item is appropriate for an item provided with error information. For example, if the user indicates that an item provided with error information is appropriate, the notifier 15 adds the description content to the database.

When an item is arranged in the first editing region 110 or the second editing region 120, the notifier 15 may generate vectors based on the item and an other item having a subordinate relationship to the item. By using the other item having the subordinate relationship to calculate the similarity, it can be determined more accurately whether or not the description content of the item is appropriate. By this method, when determining whether or not the description content of the item arranged in the first editing region 110 or the second editing region 120 is appropriate, the notifier 15 makes the description content of the multiple items used in the determination into the hierarchical structure of an ontology and stores the hierarchical structure in the database. By making the hierarchical structure and storing the hierarchical structure in the database, thereafter, it can be determined more accurately whether or not the description content of the item is appropriate.

The notifier 15 may emit a notification when a need item 111 provided with the identification information is in the first editing region 110 and a requirement item 121 associated with the need item 111 is not in the second editing region 120. Thereby, for the more important need items 111, the user can be prompted to perform the association with the requirement items 121 and the organization of the knowledge.

Figure 10:
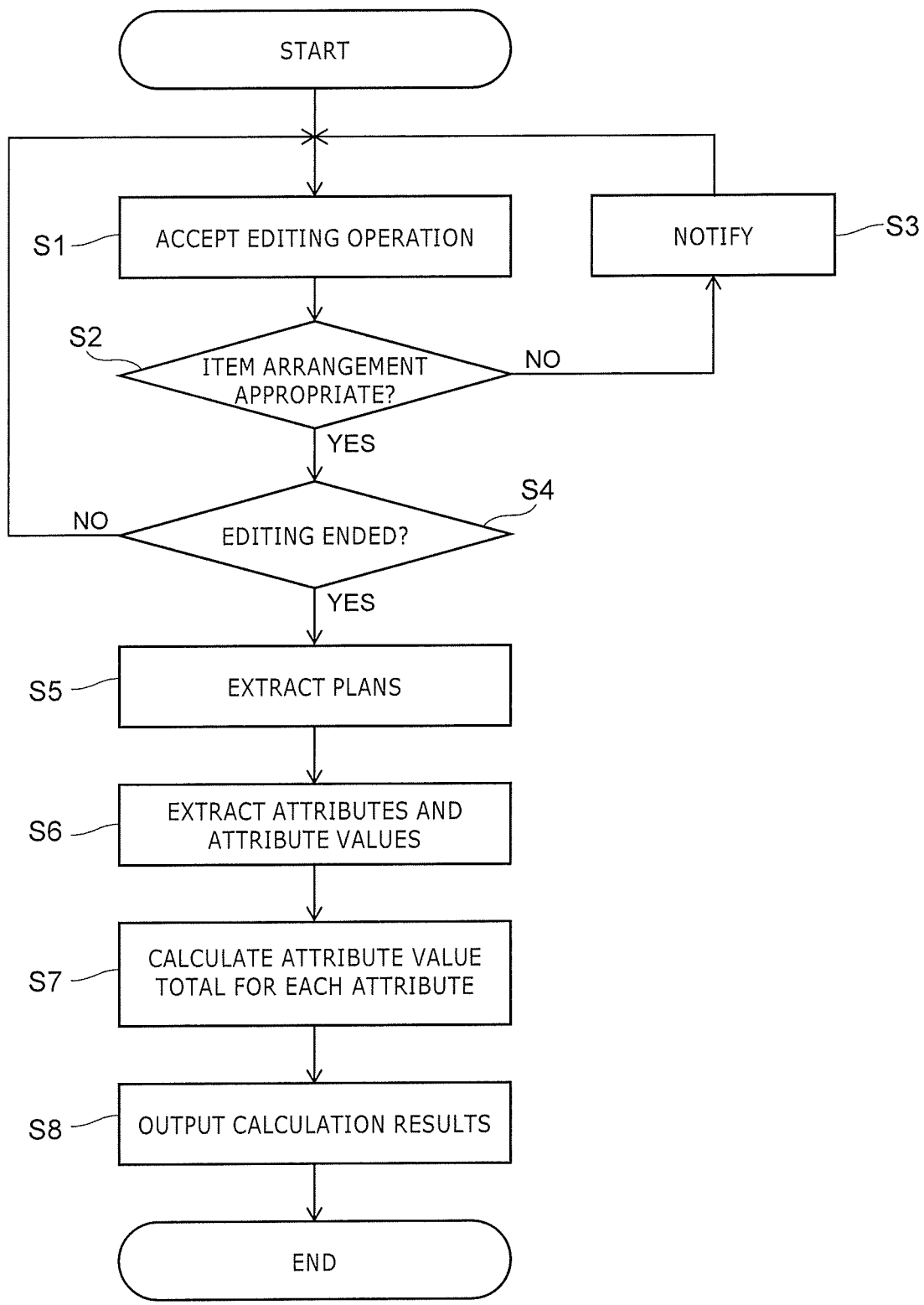
FIG. 10 is a flowchart illustrating an example of the operation of the support system 1 according to the embodiment.

FIG. 10 is a flowchart illustrating an example of the operation of the support system 1 according to the embodiment.

First, the first editing region 110 is displayed by the editor 12; and editing operations in the first editing region 110 are accepted (step S1). The notifier 15 notifies the user when an inappropriate item arrangement occurs when editing (steps S2 and S3). For example, as described above, the notifier 15 notifies the user that the arrangement of the items is inappropriate when the requirement item 121 and the approach item 122 are subordinate to one item. Steps S1 and S2 are repeated until an operation indicating the end of the editing is input (step S4). When the hierarchical structure relating to the theme item 101 is made in the first editing region 110, the plans are extracted from the hierarchical structure by the extractor 13 (step S5). The calculator 14 extracts the attributes and the attribute values from the extracted plans (step S6) and calculates the total of the attribute values for each attribute (step S7). The display device 30 outputs the total of the attribute values (step S8). In step S8, when target attributes and target attribute values are included in the hierarchical structure that is made, the display device 30 also may output the target attribute values appropriately corresponding to the totals of the attribute values.

Figure 11:
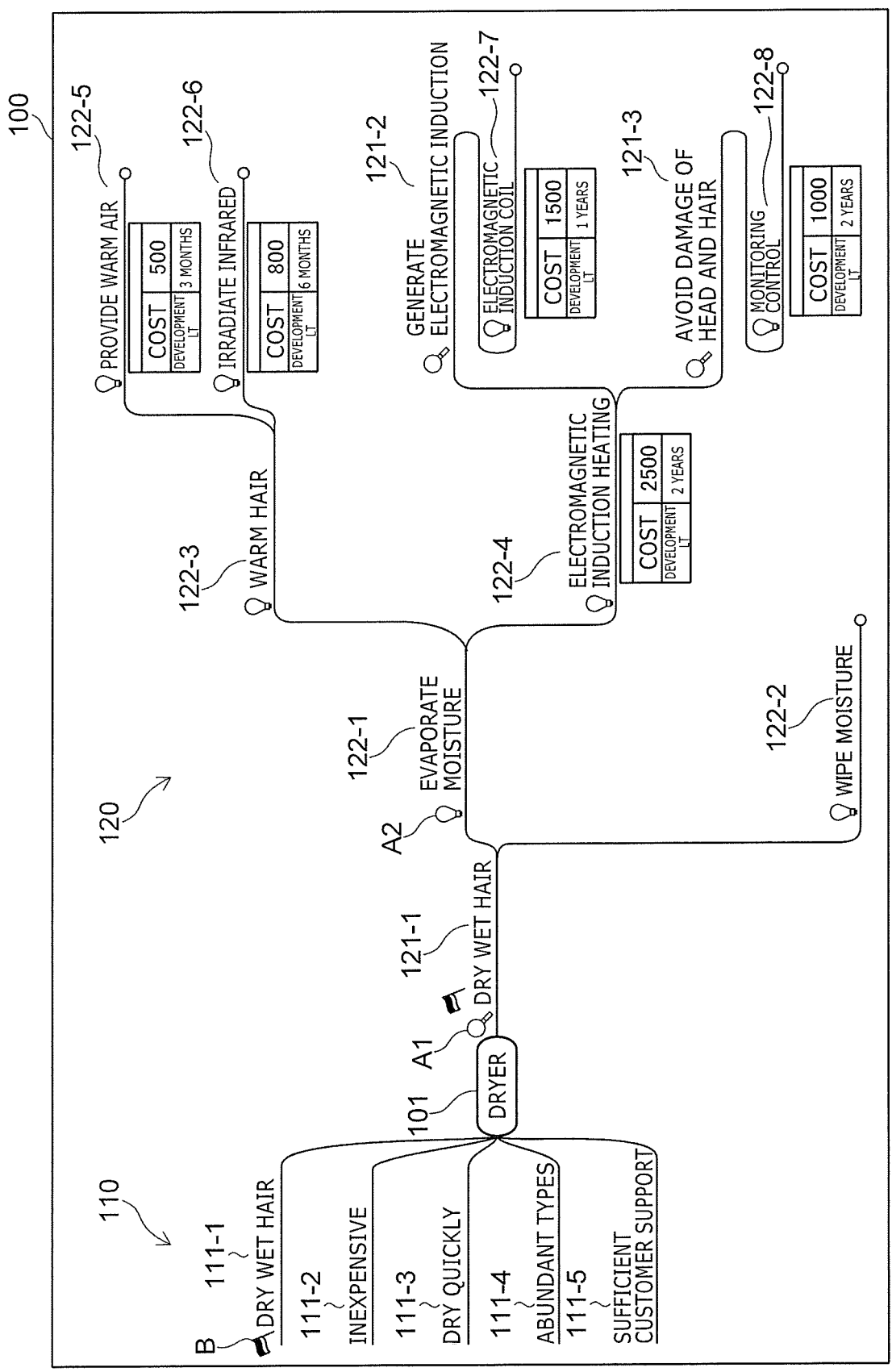
FIG. 11 is a schematic view illustrating GUIs of the support system according to the embodiment.
Figure 12:
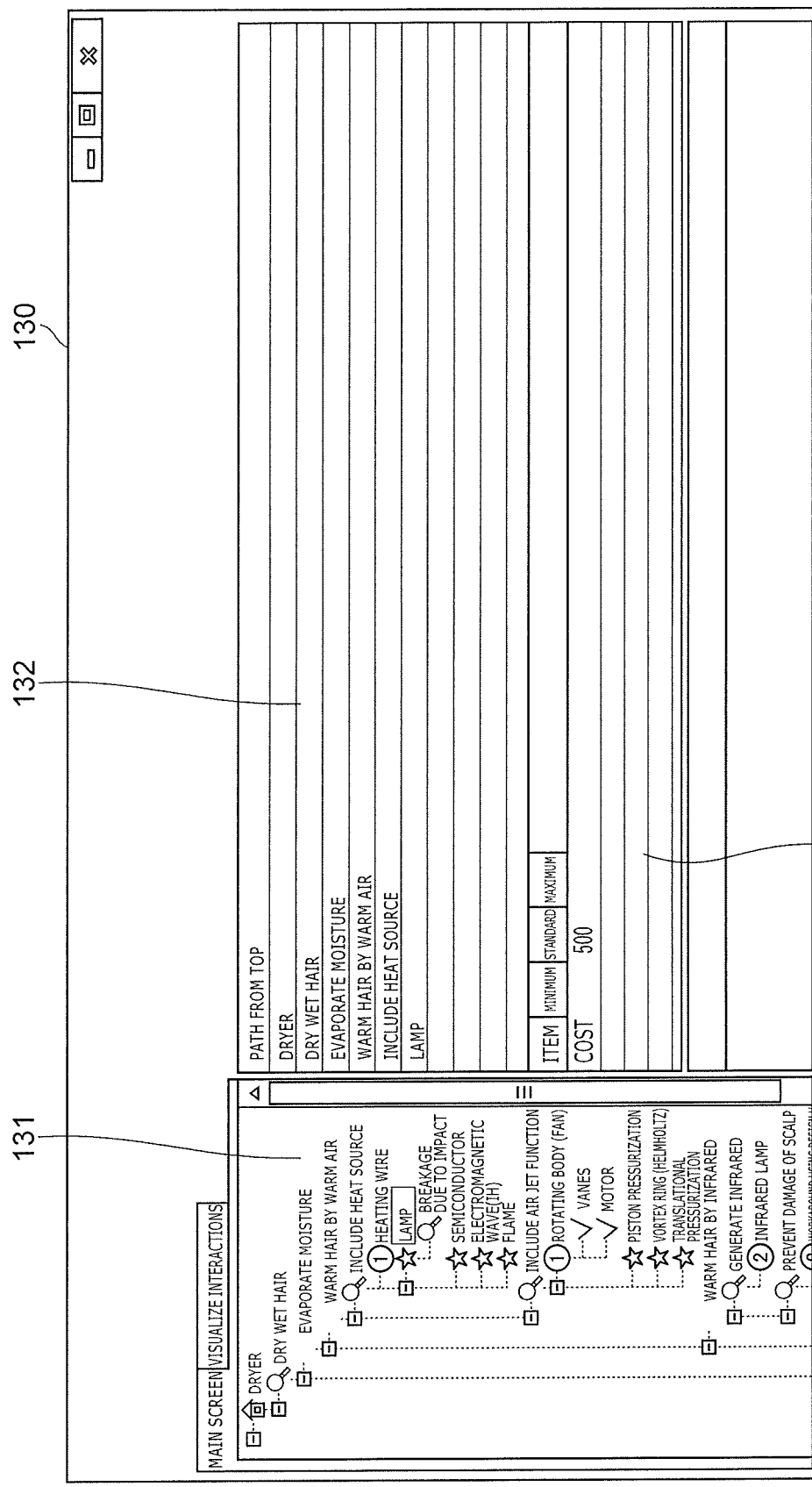
FIG. 12 is a schematic view illustrating GUIs of the support system according to the embodiment.
Figure 13:
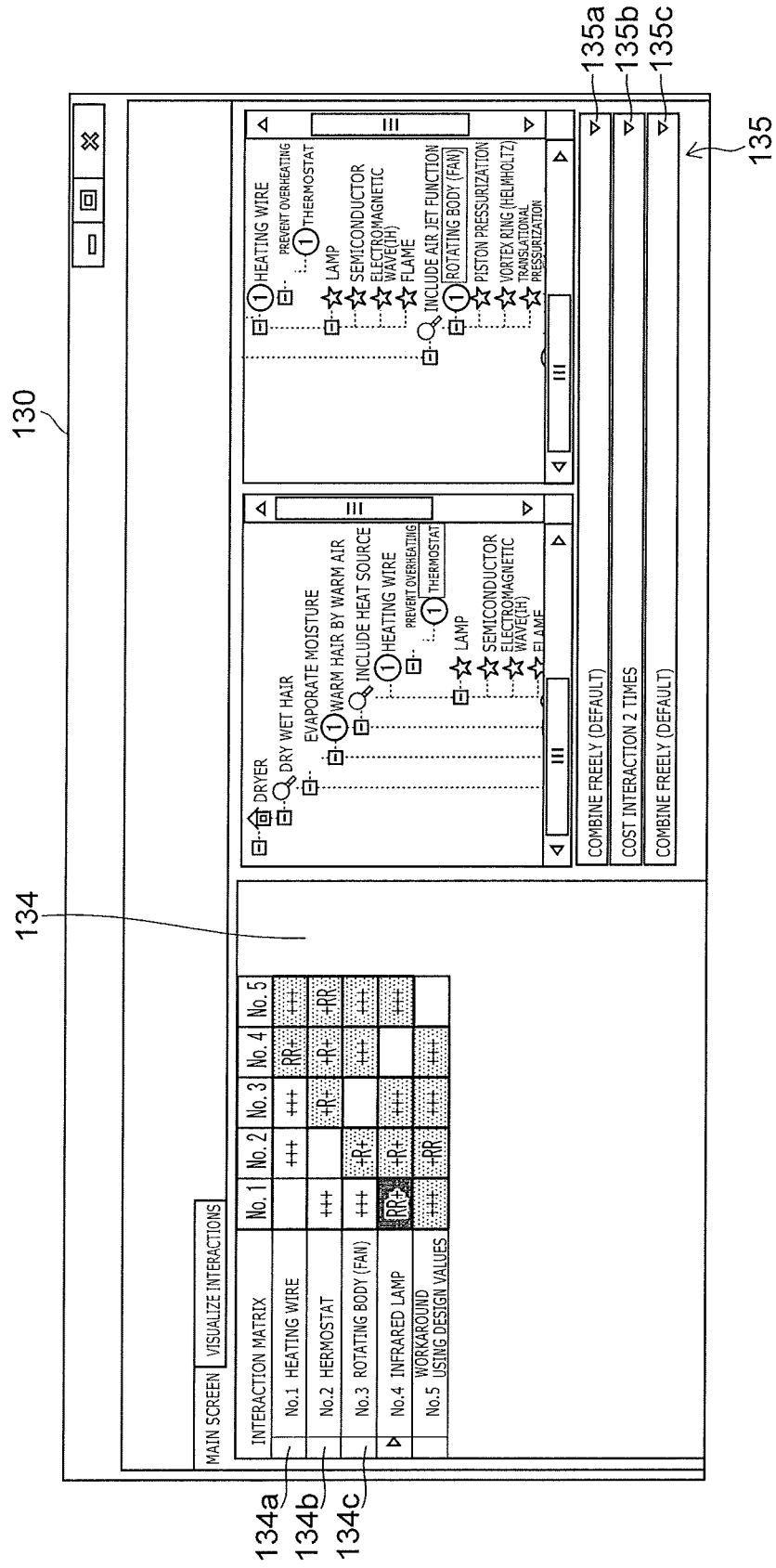
FIG. 13 is a schematic view illustrating GUIs of the support system according to the embodiment.

FIG. 11 to FIG. 13 are schematic views illustrating GUIs of the support system according to the embodiment.

FIG. 11 to FIG. 13 illustrate an example in which knowledge breakdown relating to a dryer is performed using the support system 1 according to the embodiment.

In the example illustrated in FIG. 11, the cost and the development LT (leadtime) are set as attributes. The names of the requirement item 121 and the approach item 122 can be modified as appropriate. As illustrated in FIG. 11, the positions of the items, the spacing between the items, etc., are arbitrary as long as the subordinate relationships between the requirement items 121 and the approach items 122 are represented. Also, approach items 122 may exist for which the attributes and the attribute values are not set.

For example, software for putting a Mind Map (registered trademark) into practice can be utilized for the edit functions of the editor 12 described above. For example, FreeMind, XMind, etc., can be utilized as such software. In the first editing region 110, the items that represent the requirement items 121 and the items that represent the approach items 122 are marked with information showing respectively whether each is a requirement or an approach. Based on such information, in the support system 1, the extractor 13 extracts the plans; and the calculator 14 calculates the total of the attribute values and the substantial weights for the requirement items 121 and the approach items 122 included in the plans.

Other than the first editing region 110, the editor 12 may further display a third editing region 130. FIG. 12 and FIG. 13 illustrate the third editing region 130. The third editing region 130 includes, for example, a region 131, a region 132, and a region 133 as illustrated in FIG. 12.

In the region 131, the requirements and the approaches that are edited in the first editing region 110 are displayed as tree items. In the region 132, the path from the object of the highest rank to the item selected in the region 131 is displayed. In the region 133, for example, when an approach is selected, the attributes and the attribute values of the approach are displayed.

Also, in the third editing region 130, the interactions between the approaches included in one plan can be set. FIG. 13 illustrates another screen of the third editing region 130. A region 134 and a region 135 also can be displayed in the third editing region 130.

An interaction matrix between the approaches is displayed in the region 134. One or more items for setting the interactions are displayed in the region 135. For example, when approaches have good effects on each other, the attribute of at least one of the approaches improves. When the approaches have unfavorable effects on each other, the attribute of at least one of the approaches degrades. In the third editing region 130 illustrated in FIG. 13, the interrelationships between the approaches can be set by setting the items displayed in the region 135.

For example, in the example of FIG. 13, an item 135a, an item 135b, and an item 135c are displayed in the region 135. The item 135a shows whether or not one approach and an other approach can be combined freely and independently from each other. The item 135b shows interactions relating to the cost. The item 135c shows interactions relating to time. In the initial settings, these items are set not to act on each other. In the example of FIG. 13, the notation of "+" in the region 134 indicates the initial setting; and the notation of "R" indicates that an interaction is set. The calculator 14 recalculates the totals of the attribute values for the plans including these approaches based on the set interactions.

If unset interactions of the interaction matrix are calculatable based on the interactions that are set, the calculator 14 calculates the unset interactions. For example, in the example illustrated in FIG. 13, if an interaction between an approach 134a and an approach 134b is set and an interaction between the approach 134b and an approach 134c is set, the interaction between the approach 134a and the approach 134c can be derived based on these settings. The calculator 14 reflects the calculated interactions in the interaction matrix. Thereby, it is unnecessary for the user to manually set the entire interaction matrix; and it is easy to make the interaction matrix.

For example, the processing of the various data recited above is performed based on a program (software). For example, a computer stores the program and performs the processing of the various information recited above by reading the program.

The processing of the various information recited above may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The computer may acquire (or read) of the program via a network.

At least a part of the processing of the information recited above may be performed by various software operating on a computer (or an embedded system) based on a program installed in the computer from a recording medium. The software includes, for example, an OS (operating system), etc. The software may include, for example, middleware operating on a network, etc.

The recording medium according to the embodiments stores a program that can cause a computer to execute the processing of the various information recited above. The recording medium according to the embodiments also includes a recording medium to which a program is downloaded and stored using a LAN, the Internet, etc. The processing recited above may be performed based on multiple recording media.

The computer according to the embodiments includes one or multiple devices (e.g., personal computers, etc.). The computer according to the embodiments may include multiple devices connected by a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A support system comprising:
a display control device,
the display control device including a processing circuitry,
the processing circuitry of the display control device is configured to:
   display a first editing region and a second editing region, a plurality of first items being arrangeable in the first editing region, a plurality of second items being arrangeable in the second editing region,
   accept an arrangement of a corresponding item in the second editing region, the corresponding item being associated with a first selected item arranged in the first editing region, the first selected item being one of the plurality of first items,
   accept provision of identification information to the first selected item in the first editing region,
   accept an operation of subordinating a first subordinate item to the first selected item in the first editing region,
   accept an operation of subordinating a second subordinate item to the corresponding item in the second editing region, the second subordinate item being different from the first subordinate item,
   emit a notification in a case that the identification information is provided to the first item and the corresponding item is not arranged in the second editing region,
   not emit a notification in a case that the identification information is provided to the first item and the corresponding item is arranged in the second editing region,
   accept an arrangement of a plurality of items subordinate to the corresponding item in the second editing region,
      the plurality of items includes a requirement item and an approach item,
      the requirement item is of a requirement, and
      the approach item is of an approach for satisfying the requirement,
   extract a set of one or more of the approach items as a plan,
      the one or more of the approach items are for satisfying the requirement of the requirement item of a highest rank for the plurality of items subordinate to the corresponding item,
   accept setting of an attribute and an attribute value for each of the plurality of the approach items, the attribute value relating to the attribute,
   calculate a total of the attribute values of the one or more of the approach items included in the extracted plan,
   output a result including the total of the attribute values, wherein the result further includes each of the attribute values of the one or more of the approach items, and
   accept a set of a weight for the requirement item in the second editing region, and
   in a case that the weight is set for one of the requirement item in the extracted plan, multiply one of the attribute value for one of the approach items subordinating the requirement item by the weight to calculate the total of the attribute values.

2. The system according to claim 1, wherein the processing circuitry of the display control device is configured to emit another notification when the identification information is not provided to any one of the plurality of first items arranged in the first editing region.

3. The system according to claim 1, wherein the processing circuitry of the display control device is configured to:
   accept an operation of subordinating the approach item or one of a plurality of the requirement items to another one of the plurality of the requirement items, or
   accept an operation of subordinating the requirement item or one of a plurality of the approach items to another one of the plurality of the approach items.

4. The system according to claim 3, wherein the processing circuitry of the display control device is configured to, when one of the requirement item or the approach item is subordinate to one of the plurality of first items, determine whether or not the other of the requirement item or the approach item is subordinate to the one of the plurality of first items.

5. The system according to claim 1, wherein the processing circuitry of the display control device is configured to:
accept an arrangement of a second selected item different from the first selected item in the first editing region, the second selected item being another one of the plurality of the first items,
accept an operation to associate the second selected item with the second subordinate item in the second editing region,
accept provision of the identification information to the second selected item in the first editing region,
identify the second subordinate item associated with the second selected item which the identification information is provided to and an item in the second editing region other than the second subordinate item, and
display the second subordinate item in a first form and the item in the second editing region other than the second subordinate item in a second form different from the first form.

6. The system according to claim 1, wherein the processing circuitry of the display control device is configured to:
accept an arrangement of an object item associable with one of the plurality of the approach items in the first editing region, and
display the approach item associated with the object item in a first form, and the approach item not associated with the object item in a second form different from the first form.

7. The system according to claim 1, wherein the processing circuitry of the display control device is configured to:
accept arrangements of a second selected item and a third selected item in the first editing region, the second selected item and the third selected item being of the plurality of the first items and different from the first selected item,
accept provision of identification information to the second selected item and the third selected item, and
cause a display form of the second selected item to be different from a display form of the third selected item, when an item is associated with the second selected item provided with the identification information and is arranged in the second editing region, and an item is associated with the third selected item provided with the identification information and is not arranged in the second editing region.

8. The system according to claim 1, further comprising:
a display device,
the processing circuitry of the display control device causing the display device to display the first editing region and the second editing region.

9. The system according to claim 1, wherein the result further includes the weight.

10. A non-transitory computer readable storage medium storing a program causing a processing device to function as a display control device,
the display control device configured to:
display a first editing region and a second editing region, a plurality of first items being arrangeable in the first editing region, a plurality of second items being arrangeable in the second editing region,
accept an arrangement of a corresponding item in the second editing region, the corresponding item being associated with a first selected item, the first selected item being one of the plurality of first items,
accept provision of identification information to at least one of the plurality of first items in the first editing region,
accept an operation of subordinating a first subordinate item to the selected first item in the first editing region,
accept an operation of subordinating a second subordinate item to the corresponding item, the second subordinate item being different from the first subordinate item,
emit a notification in a case that the identification information is provided to the first item and the corresponding item is not arranged in the second editing region,
not emit a notification in a case that the identification information is provided to the first item and the corresponding item is arranged in the second editing region,
accept an arrangement of a plurality of items subordinate to the corresponding item in the second editing region,
the plurality of items includes a requirement item and an approach item,
the requirement item is of a requirement, and
the approach item is of an approach for satisfying the requirement, extract a set of one or more of the approach items as a plan,
the one or more of the approach items are for satisfying the requirement of the requirement item of a highest rank for the plurality of items subordinate to the corresponding item,
accept setting of an attribute and an attribute value for each of the plurality of the approach items, the attribute value relating to the attribute,
calculate a total of the attribute values of the one or more of the approach items included in the extracted plan,
output a result including the total of the attribute values, wherein the result further includes each of the attribute values of the one or more of the approach items, and
accept a set of a weight for the requirement item in the second editing region, and
in a case that the weight is set for one of the requirement item in the extracted plan, multiply one of the attribute value for one of the approach items subordinating the requirement item by the weight to calculate the total of the attribute values.

11. A display control method of causing a processor to:
display a first editing region and a second editing region, a plurality of first items being arrangeable in the first editing region, a plurality of second items being arrangeable in the second editing region,
accept an arrangement of a corresponding item in the second editing region, the corresponding item being associated with a first selected item, the first selected item being one of the plurality of first items,
accept provision of identification information to at least one of the plurality of first items in the first editing region,
accept an operation of subordinating a first subordinate item to the selected first item in the first editing region,
accept an operation of subordinating a second subordinate item to the corresponding item, the second subordinate item being different from the first subordinate item,
emit a notification in a case that the identification information is provided to the first item and the corresponding item is not arranged in the second editing region, not emit a notification in a case that the identification information is provided to the first item and the corresponding item is arranged in the second editing region, accept an arrangement of a plurality of items subordinate to the corresponding item in the second editing region,
the plurality of items includes a requirement item and an approach item,
the requirement item is of a requirement, and
the approach item is of an approach for satisfying the requirement, extract a set of one or more of the approach items as a plan,
the one or more of the approach items are for satisfying the requirement of the requirement item of a highest rank for the plurality of items subordinate to the corresponding item, accept setting of an attribute and an attribute value for each of the plurality of the approach items, the attribute value relating to the attribute, calculate a total of the attribute values of the one or more of the approach items included in the extracted plan, output a result including the total of the attribute values, wherein the result further includes each of the attribute values of the one or more of the approach items, and accept a set of a weight for the requirement item in the second editing region, and in a case that the weight is set for one of the requirement item in the extracted plan, multiply one of the attribute value for one of the approach items subordinating the requirement item by the weight to calculate the total of the attribute values.

\* \* \* \* \*